United States Patent [19]

Kato et al.

[11] 4,330,335

[45] May 18, 1982

[54] NONFLAMMABLE BUILDING MATERIAL AND PROCESS FOR PREPARING SAME

[75] Inventors: Yasutoshi Kato; Nobuo Inui, both of Osaka, Japan

[73] Assignee: Kubota, Ltd., Osaka, Japan

[21] Appl. No.: 236,651

[22] Filed: Feb. 23, 1981

Related U.S. Application Data

[63] Continuation of Ser. No. 127,842, Mar. 6, 1980, abandoned.

[30] Foreign Application Priority Data

Oct. 23, 1979 [JP] Japan .................. 54/137377

[51] Int. Cl.³ ................................ C04B 7/02
[52] U.S. Cl. ............................. 106/99; 106/119; 106/120
[58] Field of Search .................. 106/99, 119, 120

[56] References Cited

U.S. PATENT DOCUMENTS

| | | | |
|---|---|---|---|
| 3,505,439 | 4/1970 | Moorehead et al. | 106/120 |
| 3,899,344 | 8/1975 | Jakel | 106/99 |
| 4,101,335 | 7/1978 | Barrable | 106/120 |
| 4,128,434 | 12/1978 | Pusch | 106/119 |
| 4,144,121 | 3/1979 | Otouma et al. | 106/120 |

*Primary Examiner*—James Poer
*Attorney, Agent, or Firm*—Armstrong, Nikaido, Marmelstein & Kubovcik

[57] ABSTRACT

A nonflammable building material comprising 3 to 20 parts by weight of a finely divided mineral about 10,000 cm$^2$/g in Blaine value and 0.3 to 0.8 in apparent density and 100 parts by weight of a mixture admixed therewith and composed of 20 to 60% by weight of a finely divided aggregate wholly passing through a 4-mesh screen and containing not more than 5% of particles of minus 200 mesh size, 1.0 to 7.0% by weight of a pulp, 0.05 to 2.0% by weight of an organic fiber and the balance cement and siliceous sand in a CaO/SiO$_2$ mole ratio of 0.5–1.0. The nonflammable building material is produced by a process comprising the steps of preparing a starting mixture of the above composition, spreading the mixture on a belt conveyor, causing water to penetrate into the spread mixture, shaping the wet mixture under pressure and curing the mixture in an autoclave.

10 Claims, 3 Drawing Figures

NONFLAMMABLE BUILDING MATERIAL AND PROCESS FOR PREPARING SAME

This is a continuation of application Ser. No. 127,842, filed Mar. 6, 1980, now abandoned.

BACKGROUND OF THE INVENTION

The present invention relates to a nonflammable building material comprising calcium silicate as the base material and to a process for preparing the same.

It has been common practice to prepare nonflammable building materials by a so-called dry process comprising the steps of mixing together an aggregate, cement and siliceous sand, admixing asbestos with the mixture as reinforcing fiber to obtain a starting material, spreading the starting material in the form of a layer on a belt conveyor, applying water to the material layer to cause the water to penetrate into the layer, shaping the layer by compression and curing the shaped material. When the starting material contains cement and siliceous sand in such amounts that the mole ratio of the lime component of the cement to the siliceous component of the siliceous sand ($CaO/SiO_2$) is 0.5 to 1.0, further contains 20 to 60% by weight of aggregate and is cured in an autoclave with use of high-temperature steam of increased pressure, a building panel is obtained which possesses high strength and has tough calcium silicate crystals formed therein as is already known.

However, when the nonflammable building material thus produced is used for a prolonged period of time, the material is gradually subjected to weathering and abrasion, releasing fragments of the asbestos component. Such fragments will lodge in the respiratory organs of the human body and adversely affect one's health. Accordingly it has been desired to provide nonflammable building materials without using asbestos for reinforcement.

Further in recent years, asbestos has become expensive and extremely difficult to obtain and use owing to exhaustion of resources, so that attempts are made to use other fibers in place of asbestos or to dispense with asbestos.

Asbestos imparts various properties to nonflammable building materials. Needless to say, it gives improved strength to cured building materials. In the case where such building materials are prepared by the dry process, asbestos serves to promote penetration of water into the starting material and to prevent an uncured material from cracking when it is transferred from the belt conveyor to the subsequent process in the form of a panel.

Accordingly other fibers, if useful as substitutes for asbestos, must fully fulfill these functions.

Although it has been attempted to use glass fiber for the dry process in place of asbestos, which has too smooth a surface, is liable to slip off from uncured panels and is not fully effective in reinforcing the uncured panels. Glass fiber also fails to afford an effective capillary action to cause water to penetrate into the layer of starting material.

SUMMARY OF THE INVENTION

The present invention contemplates provision of a nonflammable building material having sufficient strength and prepared by a dry process with use of an aggregate the particle size of which is adjusted to cause water to satisfactorily penetrate into the layer of starting material spread on a belt conveyor, further using pulp and organic fiber in place of asbestos for affording strength to the starting material when it is in the form of an uncured panel.

The main object of the present invention is to provide a nonflammable building material and a process for preparing the same, the building material incorporating no asbestos and yet being comparable or superior in shape retentivity and strength to those containing asbestos.

DETAILED DESCRIPTION OF THE INVENTION

Figure 1:
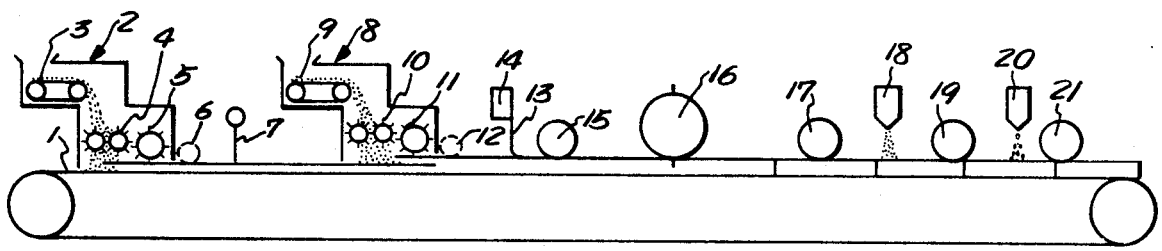
FIG. 1 is a diagram showing an apparatus for practicing the process of the invention.

FIG. 1 shows an apparatus for practicing the process of this invention. A first feed chamber 2 is provided at one end of an endless belt conveyor 1. A starting material is continuously supplied to the chamber 2 from a feed conveyor 3, agitated by blade rollers 4 and accumulated on the belt conveyor 1. The accumulated material is levelled by a spike roller 5, and then compressed by a perforated roller 6 to a layer and thereby deaerated. As will be described later in detail, the starting material is characteristic of the invention. The amount of the material supplied to the first feed chamber 2 is 50 to 70% of the total amount required.

An water applicator 7, such as a shower or flow coater, applies water to the surface of the material layer to wet the layer to a water content of 5 to 15%.

Disposed downstream from the applicator 7 is a second feed chamber 8 having the same construction as the first chamber 2 and equipped with a feed conveyor 9, blade rollers 10, a levelling roller 11 and a perforated roller 12, whereby the 30 to 50% remaining portion of the starting material is placed in the form of a layer over the wet layer.

Arranged downstream from the perforated roller 12 is a water box 14 with a piece of curtainlike cloth 13 extending downward therefrom. While passing under the water box 14, the overlying layer of the material is wetted to a water content of 5 to 15% with the water flowing down the cloth 13.

The combined layer of the material is then compressed by a back roller 15 and thereafter cut to a specified length by a roll cutter 16. The uncured panel thus cut and shaped is further compressed by a middle roller 17. A veneer (i.e. a coloring agent consisting predominantly of red iron oxide) is applied to the surface of the panel by a veneer applicator 18. A front roller 19 further compresses the resulting panel.

Granules of colored siliceous sand are loosely applied to the veneered panel by a granule applicator 20 and subsequently embedded in the veneer layer by a grain roller 21.

The uncured panel is thereafter removed from the belt conveyor 1 and spontaneously cured for 1 to 3 days as desired, whereby the panel is given the strength needed when it is to be blanked to the shape of a product (such as a roof panel). This process is omitted when the panel is in the form of the desired product.

The panel is finally placed into an autoclave and fully cured with steam at a high temperature and high pressure.

The material to be supplied to the first and second feed chambers 2 and 8 in the above process comprises 20 to 60% by weight of a finely divided aggregate wholly passing through a 4-mesh screen and containing not more than 5% of particles of minus 200 mesh size, 1.0 to 7.0% by weight of pulp, 0.05 to 2.0% by weight of organic fiber, and the balance cement and siliceous sand, the mole ratio of the lime component of the cement to the siliceous component of the siliceous sand ($CaO/SiO_2$) being 0.5 to 1.0.

Alternatively, another starting material is usable which is prepared by admixing 3 to 20 parts by weight of a finely divided mineral with 100 parts by weight of the above material, the finely divided mineral being 10,000 $cm^2/g$ in Blaine value and 0.3 to 0.8 in apparent density.

According to the invention useful cement is usual portland cement. Useful siliceous sand is one having a purity of at least 90% and a Blaine value of 2,000 to 4,000 $cm^2/g$. When the mole ratio of the CaO of cement to the $SiO_2$ of siliceous sand ($CaO/SiO_2$) is less than 0.5, the panel obtained on curing will not have sufficient strength, whereas if it is in excess of 1.0, a large amount of free lime will remain in the cured panel, giving rise to efflorescence.

When the aggregate comprises a large quantity of fine particles passing through a standard 200-mesh screen prescribed in JIS Z 8801, water will not penetrate into the material layer on the belt conveyor effectively, with the result that the shaped panel will not contain the amount of water required for curing. Preferably, therefore, the aggregate should not contain more than 5% of particles of minus 200 mesh size. On the other hand, when the aggregate is larger than 4 mesh, the resulting building material will have impaired appearance due to the presence of marked surface irregularities. Useful aggregates are 500 to 1,000 μm in mean particle size and are those prepared from hard sand or rock, hard limestone, basalt or andesite. Such aggregates are usable singly, or at least two kinds of aggregates are usable in admixture.

According to this invention, the starting material has incorporated therein an organic fiber for giving the desired bending strength to the uncured shaped body to render the shaped body removable from the belt conveyor free of bending fracture. With less than 0.05% by weight of the organic fiber present, the uncured body will not have sufficient bending strength. Use of more than 2.0% by weight of fibers is liable to permit fibers to form blocks, presenting difficulties in uniformly mixing the fibers with the other ingredients. Since organic synthetic fibers melt during autoclaving, use of an increased amount of fibers gives a building material which is markedly porous and which is likely to prove unacceptable when tested for freeze-thaw resistance according to ASTM C-666.

Examples of useful organic fibers are regenerated fibers such as rayon, POLYNOSIC, CUPRA, etc., semi-synthetic fibers as of acetate, triacetate, PROMIX, etc., synthetic fibers as of polypropylene, nylon, vinylon, acrylic resin, polyvinyl chloride, polyurethane, vinylidene, POLYCHLAL, BENZOATE, fluorine-containing resin, etc., natural fibers as of wool, cotton, hemp, etc. Such fibers are usable singly or in admixture. Useful synthetic fibers are 1.0 to 10 d in fineness and 5 to 20 mm in length. Organic synthetic fibers less than 1.0 d in fineness are difficult to commercially produce, while those larger than 10 d have low strength. Fibers shorter than 5 mm are unable to give the desired bending strength to the uncured panel, whereas those longer than 20 mm will form blocks and are difficult to incorporate into the starting material uniformly.

The starting material has further incorporated therein pulp to give cracking resistance to the uncured shaped body, rendering the body removable from the belt conveyor free of hair cracking. With less than 1.0% by weight of pulp present, the uncured shaped body will not be fully resistant to hair cracking, whereas if more than 7.0% by weight of pulp is used, the building material obtained on curing will have difficulty in passing the first-grade flame retardancy test according to JIS A 1321.

Useful pulp can be prepared from a pulp slurry (slurry of fibrous cellular material produced from softwood or hardwood by removing lignin and resinous component therefrom by the soda process, sulfite process, sulfate process, chlorine process or the like) by making the slurry into a sheet (which is commercially available), drying the sheet to a water content of not higher than 10% and finely dividing the sheet with a hammer driven at a high speed. This pulp comprises fibers which are predominantly 1.0 to 5.5 mm in length and 0.02 to 0.04 mm in fineness.

Examples of useful finely divided minerals are diatomaceous earth, kaolin, bentonite, etc., which are used singly or in admixture. These minerals are used to give an increased density to the shaped body and are therefore used in the form of fine particles. Preferably such minerals are used as finely divided to a Blaine value of about 10,000 $cm^2/g$. When having an apparent density of less than 0.3, the mineral is too light to mix with dry ingredients, failing to afford a uniform mixture easily, whereas minerals exceeding 0.8 in apparent density will add to the weight of the building material obtained and are unable to give light building materials.

When the finely divided mineral is used in an amount less than 3 parts by weight per 100 parts by weight of the combined amount of the other ingredients, difficulties will arise in preparing a building material having reduced permeability to water, whereas if it is used in an amount exceeding 20 parts by weight, the water used for shaping the uncured panel will not smoothly penetrate thereinto, failing to give a building material having a uniform quality an uniform strength. Further even if the water is applicable completely uniformly, it is still difficult to impart sufficient strength to the resulting product.

According to the present invention, the shaped panel or body must be autoclaved to subject the cement and the siliceous sand to hydrothermal reaction and thereby form calcium silicate crystals. Stated more specifically the shaped body is cured with saturated steam at 4 to 8 atm. for 5 to 10 hours.

With the process of this invention, water smoothly penetrates into the material layer on the belt conveyor, giving the layer an adequate amount of water suitable for curing, since the starting material contains relatively large and uniform particles of aggregate.

Additionally since the starting material has incorporated therein pulp and synthetic resin, the material, when in the form of an uncured shaped body, has high cracking resistance and high bending strength and is therefore removable from the belt conveyor free of hair cracking or bending fracture.

Although the building material obtained on curing contains pulp, the amount of the pulp is limited suitably, so that the cured material will prove acceptable as a first-grade product when tested for flame retardancy according to JIS A 1321.

The synthetic resin incorporated in the starting material invariably renders the resulting building material porous because the fiber melts during curing. However, since the material contains only a limited amount of the fiber and has further incorporated therein a finely divided mineral which affords a compacted structure, the material has greatly reduced permeability to water and exhibits a greatly shortened distance of ascent of water. Even when tested for freeze-thaw resistance according to ASTM C-666 over 300 cycles, the product still retains 75 to 80% of its initial strength and exhibits higher strength than conventional like products.

TEST EXAMPLE

Specimens 1 to 4 of cured nonflammable building materials were prepared from the compositions given below. Specimens 1 to 3 contained finely divided minerals, while Specimen 4 was free from any like mineral for comparison.

When tested for flame retardancy according to JIS A 1321, all the specimens were found acceptable as first-grade products.

Figure 2:
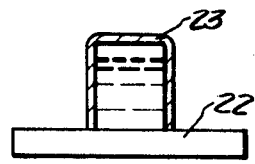
FIG. 2 is a diagram showing a specimen of nonflammable building material as it is being tested for water permeability.

The specimens were also tested for water permeability with a water-containing cup 23 placed on a specimen 22 as illustrated in FIG. 2.

Figure 3:
FIG. 3 is a diagram showing a specimen of nonflammable building material as it is being tested for the ascent of water.

The specimens were further tested for the ascent of water with a specimen 24 partly immersed in water and held at a gradient of 3/10 as seen in FIG. 3.

The test results are given in the last table, which shows that Specimens 1 to 3 containing finely divided minerals have lower water permeability and permit shorter distances of rise of water than Specimen 4 free from such mineral. This indicates that the former specimens have reduced ability to absorb water.

| Specimen 1 | |
| --- | --- |
| Aggregate | 50% by weight |
| Pulp | 5% by weight |
| Polypropylene fiber | 0.3% by weight |
| Cement | 25.0% by weight |
| Siliceous sand | 19.7% by weight |
| Diatomaceous earth | 15 parts by weight per 100 parts by weight of above composition |

| Specimen 2 | |
| --- | --- |
| Aggregate | 60% by weight |
| Pulp | 7.0% by weight |
| Polypropylene fiber | 2.0% by weight |
| Cement | 17.4% by weight |
| Siliceous sand | 13.6% by weight |
| Kaolin | 8 parts by weight per 100 parts by weight of above composition |

| Specimen 3 | |
| --- | --- |
| Aggregate | 20.0% by weight |
| Pulp | 1.0% by weight |
| Polypropylene fiber | 0.05% by weight |
| Cement | 44.2% by weight |
| Siliceous sand | 34.75% by weight |
| Bentonite | 20 parts by weight per 100 parts by weight of above composition |

| Specimen 4 | |
| --- | --- |
| Aggregate | 60% by weight |
| Pulp | 7.0% by weight |
| Polypropylene fiber | 2.0% by weight |

| -continued | |
| --- | --- |
| Cement | 17.4% by weight |
| Siliceous sand | 13.6% by weight |

| Specimen No. | Water permeability (mg/cm² . 7 days) | Distance of ascent of water (cm/day) | Strength retentivity after freeze-thaw (%) |
| --- | --- | --- | --- |
| 1 | 90 | 4 | 78 |
| 2 | 120 | 7 | 75 |
| 3 | 75 | 3 | 80 |
| 4 | 150–200 | 8–10 | 70–80 |

What is claimed is:

1. A process for preparing a nonflammable building material from aggregate and cement containing lime characterized by the steps of:

mixing together 20 to 60% by weight of a finely divided aggregate which wholly passes through a 4-mesh screen and contains not more than 5% of particles of minus 200 mesh size, 1.0 to 7.0% by weight of a pulp prepared from a fibrous cellular material, 0.05 to 2.0% by weight of an organic fiber and the balance cement and siliceous sand in a CaO to SiO$_2$ mole ratio of 0.5–1.0 to prepare a starting material, spreading the starting material on a travelling belt conveyor in the form of a layer of uniform thickness, applying water to the upper surface of the layer to cause the water to penetrate into the layer, compressing the wet layer with a roller for shaping, cutting the compressed and shaped layer to a specified size, and removing the cut layer from the belt conveyor and curing the layer with steam after or without spontaneously curing the layer.

2. A process as defined in claim 1 wherein the organic fiber is polypropylene fiber.

3. A process for preparing a nonflammable building material from aggregate and cement containing lime characterized by the steps of:

admixing 3 to 20 parts by weight of a finely divided mineral with 100 parts by weight of a mixture composed of 20 to 60% by weight of a finely divided aggregate which wholly passes through a 4-mesh screen and contains not more than 5% of particles of minus 200 mesh size, 1.0 to 7.0% by weight of a pulp prepared from a fibrous cellular material, 0.05 to 2.0% by weight of an organic fiber and the balance cement and siliceous sand in a CaO to SiO$_2$ mole ratio of 0.5–1.0 to prepare a starting material, spreading the starting material on a travelling belt conveyor in the form of a layer of uniform thickness, applying water to the upper surface of the layer to cause the water to penetrate into the layer, compressing the wet layer with a roller for shaping, cutting the compressed and shaped layer to a specified size, and removing the cut layer from the belt conveyor and curing the layer with steam after or without spontaneously curing the layer.

4. A process as defined in claim 3 wherein the organic fiber is polypropylene fiber.

5. A process as defined in claim 3 wherein the finely divided mineral is about 10,000 cm²/g in Blaine value and 0.3 to 0.8 in apparent density.

6. A nonflammable building material containing aggregate and cement containing lime, characterized in that the nonflammable building material comprises 20 to 60% by weight of a finely divided aggregate which wholly passes through a 4-mesh screen and contains not more than 5% of particles of minus 200 mesh size, 1.0 to 7.0% by weight of a pulp prepared from a fibrous cellular material 0.05 to 2.0% by weight of an organic fiber and the balance cement and siliceous sand in a CaO to $SiO_2$ mole ratio of 0.5–1.0 and is prepared by curing with steam.

7. A nonflammable building material as defined in claim 6 wherein the organic fiber is polypropylene.

8. A nonflammable building material containing aggregate and cement containing lime, characterized in that the nonflammable building material comprises 3 to 20 parts by weight of a finely divided mineral and 100 parts by weight of a mixture admixed therewith and composed of 20 to 60% by weight of a finely divided aggregate which wholly passes through a 4-mesh screen and contains not more than 5% of particles of minus 200 mesh size, 1.0 to 7.0% by weight of a pulp prepared from a fibrous cellular material, 0.05 to 2.0% by weight of an organic fiber and the balance cement and siliceous sand in a CaO to $SiO_2$ mole ratio of 0.5–1.0 and is prepared by curing with steam.

9. A nonflammable building material as defined in claim 8 wherein the organic fiber is polypropylene.

10. A nonflammable building material as defined in claim 8 wherein the finely divided mineral is about 10,000 $cm^2/g$ in Blaine value and 0.3 to 0.8 in apparent density.

* * * * *